E. Matteson,
Converting Motion.
N° 21,611. Patented Sep. 28, 1858.
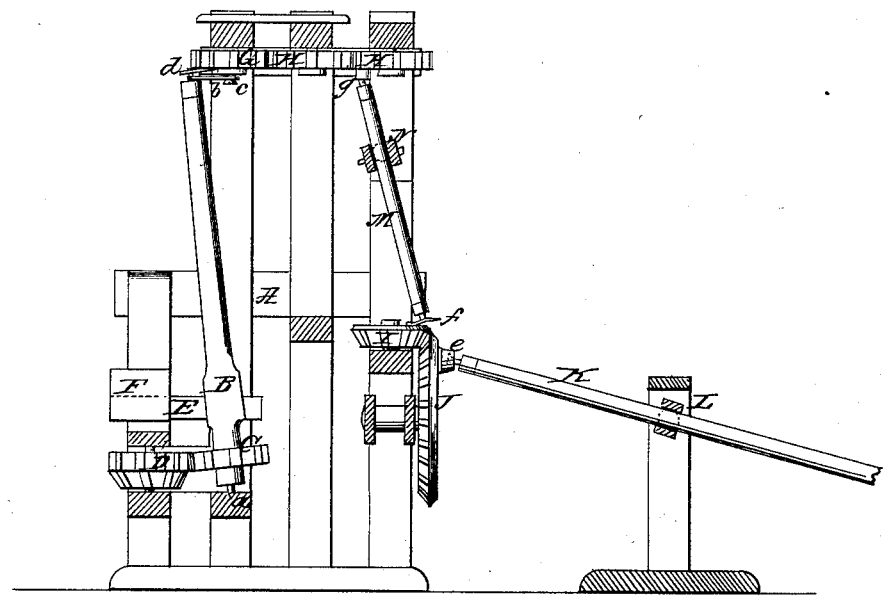
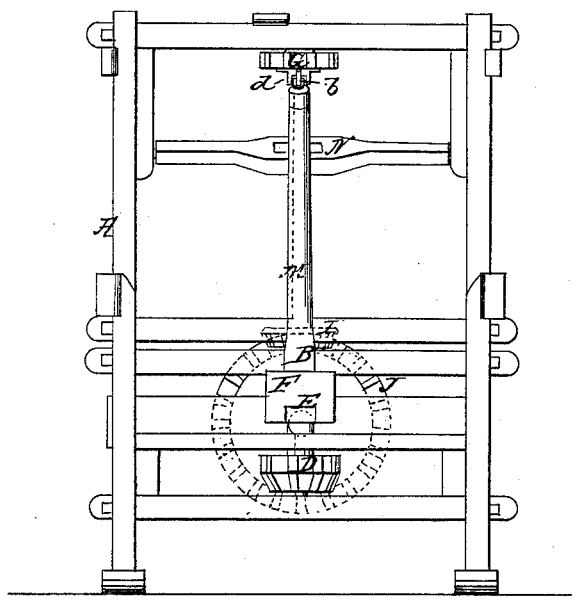

UNITED STATES PATENT OFFICE.

ELISHA MATTESON, OF TROY, NEW YORK.

MECHANICAL POWER.

Specification of Letters Patent No. 21,611, dated September 28, 1858.

*To all whom it may concern:*

Be it known that I, ELISHA MATTESON, of the city of Troy, in the county of Rensselaer and State of New York, have invented a certain new and useful device for applying the momentum gained by a falling weight and the centrifugal force developed by rotating the same to drive some machinery or to do a certain amount of work; and I do hereby declare that the following is a full, clear, and exact description of the same, reference being had to the annexed drawings, making part of this specification, in which—

Figure 1, represents a vertical longitudinal central section of my apparatus, and, Fig. 2, is a front elevation of ditto.

Similar letters in the two figures refer to corresponding parts.

The nature of my invention consists in the employment of a revolving shaft set oblique to a vertical line and having an arm which carries a weight, projecting nearly at right angles from it, in combination with a system of gearing and levers hereinafter described, whereby the oblique shaft is revolved from its upper end by very little manual power, and owing to the upper end of the shaft being set oblique and at a point at right angles to, and preceding the point at which the weight is attached, the weight, when it assumes an elevated position above or behind the oblique side of the shaft, which it will, by reason of gravity and the power applied to the shaft be compelled to descend to a position below or in front of the oblique shaft, and thus assist in propelling, by giving an impetus to the shaft and transmitting gearing attached thereto. It will be observed that the motion is a continuous rotary one and that the weight is constantly being elevated and made to aid in propelling by its gravity as it descends, and that the loss of power experienced in lifting the weight by a long leverage, i. e. from the upper end of the shaft and by the auxiliary leverage hereinafter specified, will be of no moment compared with the amount of power gained and impetus given to the shaft by the alternate descending of the weight, which results from the obliquity of the shaft and the point of attachment of the weight to the shaft being behind the point of attachment of the shaft to the first gear wheel of the system of gearing which I adopt, said location of the points of attachment compelling the weight to chase the shaft with an increasing speed commensurate with the increasing velocity of the shaft and this invention consists in so connecting the upper end of an inclined shaft having a weight attached to an arm extending from the same, with a wheel which is placed in a horizontal position, at a point outside the center of said wheel, that by rotating the wheel the top of the shaft is rotated at the same time, whereby the plane of inclination is continually changed, and consequently the weight is continually (as long as the rotation of the wheel endures,) kept in a state seeking to come into that plane, that is: the weight is continually in a falling condition. The momentum gained by this operation in connection with the momentum of the centrifugal force which develops itself by the rotation of the falling weight is employed to overcome the resistance of a number of machines, it is made to do a certain amount of work and I claim that I can do more work with my arrangement in proportion to the power expended in giving motion to the apparatus, than can be done by any other driving power heretofore in use.

To enable others skilled in the art to fully understand and construct my apparatus I will proceed to describe it.

In a frame A, constructed of wood or other material is a shaft B, placed in an inclined position. Its lower end terminates into a point $a$, and rests in a corresponding socket in one of the cross braces of the frame. A wheel C, is fastened on the shaft B, close to its lower extremity and this wheel gears into another wheel D, from which power is transmitted to the working machines. Not far above the wheel C, an arm E, extends from the shaft B, being rigidly attached to the same, and a weight F, is secured on the outer end of said arm. The upper end of the shaft B, is hung into a strap $b$, which is attached to a pivot $c$, on which a wheel G, rotates, and a fork-shaped piece $d$, is attached to the side of the wheel fitting loosely over the end of the shaft B, with its forked end. Motion is conveyed to the wheel G, by a suitable gearing H, H, in connection with the bevel wheels I, J. The bevel wheel J, derives its motion from a lever K, the shorter arm of which terminates into a sort of ball and socket joint, the socket $e$, being attached to the side of the wheel. The fulcrum of the lever forms a swinging joint L, and the longer end of the same is rotated by a crank or other suitable means. A similar arrangement serves to transmit the power from the bevel wheel I, to the cog wheel H, a lever M, being employed which has its fulcrum in a swinging joint N, its longer end being connected to a forked piece $f$, which is attached to the side of the bevel wheel I, while the shorter end of said lever terminates into a ball and socket joint, the socket $g$, being attached to the side of the wheel H. The object of transmitting power by means of these levers is to enable me to start the apparatus with as much ease as possible, and it is obvious that this object can be obtained with more or less perfection according to the proportion of the arms of the several levers and according to the number of levers employed which may be increased at pleasure.

The operation of my apparatus is as follows: By rotating the wheel G, in one direction or in the other the top of the shaft B, is put in motion and the plane of inclination changes. The weight F, which in consequence of its gravity is compelled to seek to place itself into that plane of inclination, will therefore follow up the top of the shaft in its rotation and it will commence to rotate and continue so as long as the wheel G, is kept in motion. In so moving said weight will acquire a certain momentum which is further increased by the centrifugal force developed by rotating the weight and the power gained by this momentum I propose to employ in doing a certain amount of work.

Having thus described my invention what I claim as my invention and desire to secure by Letters Patent, is—

The arrangement of gearing L, R, J, I, M, N, H, H, in combination with the shaft B, weight F, and wheel G, substantially as and for the purposes set forth.

ELISHA MATTESON.

Witnesses:
W. TUSCH,
HENRY T. BROWN.